C. F. BILLAU.
WEEDER.
APPLICATION FILED MAY 20, 1909.

933,227.

Patented Sept. 7, 1909.

Witnesses:
L. A. St. John
Ira Andre

Inventor
Charles F. Billau
By J. M. St. John
Atty

UNITED STATES PATENT OFFICE.

CHARLES F. BILLAU, OF CEDAR RAPIDS, IOWA.

WEEDER.

933,227.

Specification of Letters Patent.   Patented Sept. 7, 1909.

Application filed May 20, 1909.   Serial No. 497,249.

*To all whom it may concern:*

Be it known that I, CHARLES F. BILLAU, a citizen of the United States, residing at Cedar Rapids, in the county of Linn and State of Iowa, have invented certain new and useful Improvements in Weeders, of which the following is a specification.

The object of this invention is to produce a simple implement for the easy and speedy removal of noxious weeds, such as dandelions, from lawns.

The nature of the invention will fully appear in the description and claims following, reference being had to the accompanying drawing forming a part of this specification.

Figure 2:
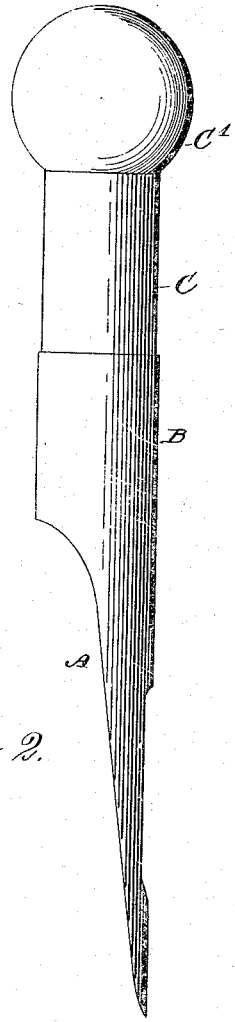
Figure 4:
Figure 4:
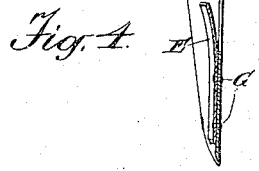
Figure 3:
Figure 1:
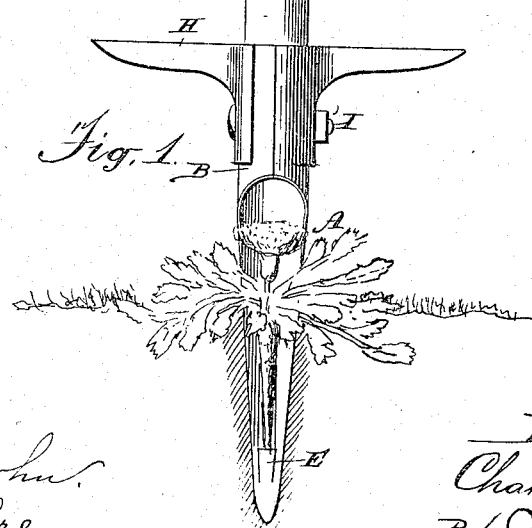

Figure 1 is a front view of a weeder embodying the invention with a long handle and foot brackets. Fig. 2 is a side view of a short hand tool containing the same general features. Fig. 3 is a central vertical section of the same without the handle. Fig. 4 is a similar fragmentary section showing a modification of the construction of the lower end of the tool.

In the care of a lawn one of the most difficult things is to keep it clear of objectionable weeds, and of these one of the most persistent and difficult to eradicate is the common dandelion. A great many implements have been devised for the purpose of removing this pest, but the ends sought to be obtained in this invention are simplicity in construction, ease of operation and the complete removal of the weed and its root with very slight disturbance of the soil.

Referring now to the drawing: A denotes a pointed tool of sheet steel corresponding in general form and appearance quite closely to an ordinary steel pen. A tubular portion B forms suitable shank to which may be inserted or attached a short handle C adapted for close work, or a long handle D adapted for use while the operator is standing erect. In the former case the handle is preferably provided with a spherical head $C^1$ which forms an easy hand-hold and is also convenient for pressing down the earth after the removal of the weed, so as to heal the small spot in the lawn. The lower end of the tool tapers down to a point and is preferably made sharp at the edges so as to easily penetrate the soil however hard. A short distance up from the point is an inwardly projecting tang or barb E which serves to catch the root of the weed, in precisely the same way as does the barb of an ordinary fishhook, and when the tool is withdrawn the weed, root and all, as caught by this barb, is drawn straight up out of the ground. In practice the tang is best formed from the body of the curved steel forming the point, as clearly shown in Figs. 1 and 3, being thrust inwardly from such material, as clearly indicated. The slot F, formed by this forcing out of the tang, is continued some distance above it for the double purpose of providing an opening into which the weed root may slip as the tool is withdrawn, and also to prevent the lodgment of earth in the tool behind the tang. I have also illustrated in Fig. 4 a separate tang attached to the tool point in some suitable way, as by rivets G. This would make it possible to form the tang of flexible tempered steel or the like and the body of the tool of some other material. In practice, however, the simpler construction as shown in the other figure is preferred.

The construction shown in Fig. 1 is better adapted for large sized implements, more especially for large weeds, such as dock and the like, and in hard soil. For this purpose it may be provided with one or more foot brackets H, suitably attached as by a bolt I which may also serve to fasten the tool to its handle, by the aid of which the operator may force the implement into the ground with his foot. The long handle may of course be provided for any size of tool, thus making it convenient for the operator to stand erect while doing the work.

The operation itself is very simple, and consists simply in thrusting the tool down near the root of the weed and withdrawing it with a slight movement forward. This brings up the weed root and all, and with the smallest possible quantity of earth, so that there is practically no disfigurement of the lawn in the process of weeding.

Having thus described my invention I claim:

1. A weeder having a penlike form, provided near its point with an inwardly projecting tang adapted to catch the weedroot as the implement is withdrawn.

2. A weeder, of sheet steel, having a tubular shank and a curved and pointed blade provided near its lower extremity with an inwardly projecting tang, substantially as and for the purpose set forth.

3. A weeder provided with a tubular shank and a curved and pointed blade, having an inwardly projecting tang near its lower end and an adjacent upwardly extending slot, substantially as and for the purpose set forth.

4. A weeder comprising a curved and pointed blade provided with an inwardly projecting tang, and a shank with an attachment to a handle, a long handle, and one or more foot brackets fastened thereto.

5. A weeder comprising a tapered blade, curved in cross section, and provided near its pointed lower end with an inwardly projecting tang, and a handle for said blade.

In testimony whereof I affix my signature in presence of two witnesses.

CHARLES F. BILLAU.

Witnesses:
J. M. St. John,
Charles Estes.